United States Patent Office 3,086,370
Patented Apr. 23, 1963

3,086,370
GASIFIED PRODUCT
Harry M. Barnes, Valley Cottage, N.Y., and William A. Mitchell, Lincoln Park, and Leon T. Kremzner, Upper Saddle River, N.J., assignors to General Foods Corporation, White Plains, N.Y., a corporation of Delaware
No Drawing. Filed Oct. 2, 1959, Ser. No. 843,912
3 Claims. (Cl. 62—1)

This invention relates to a technique for storing gas at atmospheric pressure in a limited volume. More specifically, it relates to a novel gasified ice, which may be maintained for extended periods of time at atmospheric pressure, from which gas may be liberated as desired.

As is well known to those skilled in the art, large quantities of various gases are commonly handled, transported, and used in industry, the laboratory and other places. Because of the physical properties of the gases, they are typically maintained and stored in thick-shelled containers under substantial pressure. This technique of handling gases is less than totally satisfactory for several reasons. The cost of manufacturing and, more importantly, the cost of handling the containers is excessive; in many cases the latter is disproportionately large in comparison to the value of the gas within the container. Furthermore, the necessity for storing the gas under high pressures, requires use of specialized techniques.

One object of this invention is to provide a novel product which contains a substantial amount of gas at atmospheric pressure in a limited volume. Another object is to provide a technique for producing such a product. Other objects will be apparent to those skilled in the art on inspection of the following description.

According to one aspect of this invention, a gasified ice characterized by a high gas content and a high degree of stability may be prepared by contacting aqueous liquid with a conditionally stable hydrate forming gas under pressure at least equal to the conditionally stable hydrate forming pressure; maintaining said aqueous liquid and said gas in contact for time sufficient to permit absorption in said liquid of gas in the form of a conditionally stable hydrate, maintaining the temperature of said liquid and said gas during said absorption within the gasified-ice-freezing temperature range, and withdrawing gasified ice.

In carrying out the process of this invention, the gasified ice product will preferably be prepared from water. Although some advantages in terms of reproducibility of precise conditions may be obtained by using distilled water, it is one of the features of this invention that water can be employed without any pretreatment. If it be desired to use the ultimate product for edible uses including, e.g., preparation of beverages, various materials including sugar, color, flavor, etc., may be added to the water. The term water or aqueous liquid will be hereinafter employed to include water containing these materials as well as water, per se.

It may be possible to conduct the process of this invention continuously or batchwise. Under preferred conditions, the water may be placed within any suitable apparatus which is capable of withstanding the various temperatures and pressures prevailing during the course of the process. Gas in requisite amount, as hereinafter noted, is then admitted to the reaction vessel. It may be possible to add the gas in solid or liquid form; under preferred conditions, it will be admitted in gaseous form.

The conditionally stable hydrate forming gases which may be used in accordance with this invention include those gases which, under the conditions hereinafter set forth, form hydrates having hereinafter designated properties. They are gases under atmospheric pressure, they have a boiling point below about 0° C., and when combined with water in accordance with this invention give product hydrate-ices containing more than about 9 moles of water per mole of gas. These hydrates appear to be characterized by a loose bond between the gas and the water; gases which are tightly bound to the water, e.g., sulfur trioxide, do not form hydrates which may be used in practice of this invention. However, the solid hydrates, when prepared and stored under the conditions hereinafter noted, are stable for indefinite periods during which they retain their original physical and chemical properties. The hydrates may be decomposed by melting, e.g., by dropping into a warm liquid.

Typical of the gases are various oxides of non-metals, typically nitrous oxide; sulfur containing gases including hydrogen sulfide; chlorine containing gases including chlorine or methyl chloride; helium and other inert gases, i.e., argon, krypton, neon, etc.; carbon monoxide, and carbon dioxide.

It will be apparent to those skilled in the art that gases typified by fluorine which react with water to decompose the water are not included within the scope of this invention; nor are gases such as sulfur trioxide which form a hydrate having a very high degree of stability; nor are gases such as nitrogen, oxygen, or hydrogen which do not form unstable hydrates. Other examples will be apparent to those skilled in the art.

Although it is not possible to state precisely why the hereinbefore noted unexpected and surprising results are obtained, it may be, particularly in the case of the preferred inorganic gases including, e.g., nitrous oxide, carbon dioxide, carbon monoxide, helium, hydrogen sulfide, chlorine etc., that some readily reversible reaction occurs between an inorganic portion of the molecule and the water with resulting formation of a compound.

When the reaction is conducted batchwise and the gas is to be added in gaseous form, the water will preferably be agitated and the gas under pressure will be admitted to the reaction chamber. Although the pressure may be varied depending upon the prevailing conditions and upon the gas, it will be above the conditionally-stable-hydrate-forming pressure.

The conditionally-stable-hydrate-forming pressure of a particular gas may readily be determined by plotting the amount of gas retained in the frozen solid at various times at various pressures. At very low pressures, it will be noted that the amount of gas retained within the ice rapidly approaches a maximum or plateau (as the time of contact increases) at which point it remains regardless of how long the system is maintained under the constant pressure conditions of operation. If other runs are made wherein the pressure of operation is higher, a particular pressure (the conditionally stable hydrate forming pressure) may be reached above which the amount of gas retained in the ice approaches a maximum or plateau, at which point it remains for a period of time which is less at higher pressure, and then the amount of gas increases substantially to a much higher level. This increase in quantity of gas retained in the solid signifies the formation of an unexpected hydrate. The so-formed hydrate is said to be conditionally stable because (a) it possesses a stability under the hereinafter defined conditions and (b) it may readily be decomposed by melting.

Although this conditionally stable hydrate forming pressure may vary for different gases, it may be of the order of 150–200 p.s.i.g.; when the gas is nitrous oxide, it appears to be about 150 p.s.i.g.; for carbon dioxide, it appears to be about 200 p.s.i.g. The amount of gas entrapped or retained within the ice at this pressure may be called "the minimum hydrate quantity" of gas. A more preferred term is "minimum hydrate ratio" which will be employed to designate the number of milliliters of gas per gram of product ice.

The upper limit of pressure which should be employed at the end of the reaction will preferably be less than the vapor-liquid equilibrium pressure of the gas at the temperature of operation, under which condition there will be substantially no formation of liquified gas within the system. When the gas employed is nitrous oxide, this pressure will be about 600 p.s.i.g.; when the gas is carbon dioxide, this pressure will be about 600 p.s.i.g. Other gases may have higher or lower vapor-liquid equilibrium pressure at the temperature of operation. Generally, 600 p.s.i.g. may represent a maximum pressure below which it is preferred to operate in accordance with this invention.

It is possible in accordance with prior art techniques, to incorporate small amounts of gas, e.g., carbon dioxide, into water at low pressures and to freeze the resulting mixture to give a gasified ice. For example, if the gas be carbon dioxide and the pressure be 50 p.s.i.g., the volume of carbon dioxide enclosed within the ice may be only of the order of about 4–5 milliliters of gas per gram of ice; if the pressure be increased to, e.g., 70 p.s.i.g., the gas content is raised to, e.g., about 8; even if the pressure be increased to about 150 p.s.i.g., the gas content is only increased to about 14–15.

It is a feature of this invention that use of gas pressures above the hydrate forming pressure of approximately 150–200 p.s.i.g. permits attainment of ice containing an unexpectedly large gas content. Below this pressure, the maximum ratio appears to be below 19 in the case of carbon dioxide; and in the case of, e.g., nitrous oxide, the ratio appears to be below 15. As higher pressures are used, up to about 600 p.s.i.g., it is possible to increase the amount of gas in the product ice after a particular time, or alternatively to obtain in a shorter time, much greater amounts up to a level of about 120 milliliters of gas in the case of carbon dioxide per gram of ice. Preferably the pressure of operation will be 200–400 p.s.i.g.

The temperature of the aqueous liquid during pressurization thereof with gas should be (a) above the freezing point of that liquid under the prevailing pressure, i.e., above about 0° C. when pure water is employed; and preferably (b) slightly below the freezing point of the product ice under the conditions of operation. The temperature of the system during the reaction, as above defined, will be referred to as the gasified-ice-freezing range and will encompass the range from about 0° C. up to the freezing point of the gasified ice which may be as high as 14° C. or more. The reaction mixture may be maintained, by appropriate means, e.g., immersion in a bath, at the desired temperature. As the gas is absorbed into the agitated liquid, more gas may be admitted to the system to maintain gas pressure at the desired level within the preferred limits of 150 p.s.i.g. or 200 p.s.i.g. up to 600 p.s.i.g. Preferably the gas pressure will be maintained constant during the course of the reaction.

The time of contact of the liquid and the gas and the other conditions noted may vary somewhat depending on the particular characteristics of the system in which the reaction is carried out. Typically, however, the time of reaction will be controlled to give the desired amount of gas in the product varying from, e.g., in the case of carbon dioxide 25–75.5 to about 100 ml. per gram of ice and in the case of nitrous oxide 15 to about 100 ml. per gram of ice. It will be preferably controlled to give at least about 50–90 ml. per gram for carbon dioxide and 40–55 for nitrous oxide.

At the end of the desired time, the frozen product will be removed from the reaction vessel and may generally be used as so-obtained. However, when it has been prepared at pressures above about 400 p.s.i.g., it is preferred that it be degassed or stabilized for about 24 hours at about −10° C. During this period, any gas which may loosely be held within the product is evolved. Liquid, which may be within the mass, generally volatizes and passes off from the solid product during this degassing period. The various analytical techniques for determining the amount of gas within the "product" ice, etc. are conducted on this degassed or stabilized product.

The freezing points of the gasified ices prepared in accordance with this invention are all above 0° C. and may be as high as, e.g., 14° C. or more under pressure. In this respect, they differ from ices containing lesser amounts of gas and from ices prepared at pressure below those prescribed for the process of this invention. Ices prepared at pressure less than about 150–200 p.s.i.g. and/or containing less than the indicated minimum of gas per gram of ice, have melting points which are at or below 0° C.

There is a further indication of discontinuity which may indicate that there is unexpected compound formation or some unusual bonding force other than mere physical entrapment of the gas by the ice when the process is carried out above the minimum pressure noted. It has been found, for example, in the case of nitrous oxide that it is not possible to prepare a gasified ice containing a higher ratio of gas to solid than about 15 ml. of gas per gram of product ice when the pressure of operation is less than about 150 p.s.i.g. For example, if the process is conducted at 50 p.s.i.g., a maximum ratio of about 3 is obtained after about 45 minutes and the ratio is maintained at about this level regardless of how much longer the pressurization is conducted. If the pressure be about 100 p.s.i.g., the asymptotic maximum, also reached after about 30 minutes, is about 7.

It thus appears that under the particular conditions of operation prescribed for this process that the gas, e.g., nitrous oxide, retained in the product in ratios greater than the indicated minimum, e.g., 15 is present in some unusual or unexpected form. The term "bound gas" may be used to describe this gas and specifically it refers to the gas which, in amount greater than the indicated minimum, is not vaporized from the gasified ice of this invention when the latter is stabilized at −10° C. for 24 hours and which, in view of the above-noted anomalous behavior, appears to be present in a characteristic but unexpected manner.

As the pressure is increased above 125–150 p.s.ig. in the case of nitrous oxide, the plots of gas within the ice as a function of time of contact generally quickly reach a plateau at or substantially above about 15; remain at this plateau for a brief period of time which is less at higher pressures; and then rise higher, the height generally increasing as the pressure increases. For example, in one series of runs, the gas enclosed at 50, 100, 150, 200, 300, and 400 p.s.i.g. was about 3, 7, 15, 57, 60 and 80 ml. of gas per gram of ice, respectively, after 90 minutes of stirring at a temperature of 0° C. It is possible, by operating at different pressures within the limits herein noted, to obtain the same level of gas enclosure by varying the time.

The upper limit of the range of pressures which can be employed, for all practical purposes, will be about 600 p.s.i.g. More specifically, it is found that the product gasified ice is more stable when the pressure of the gas is correlated with the temperature of the water-gas mixture so that the pressure is less than the liquid-vapor equilibrium pressure of the gas at that temperature.

The gasified ice so-prepared resembles ordinary ice. It may be cloudy or clear in appearance, and is free of liquid. It is a particular feature of this invention that when prepared according to the preferred technique, the ice-product has a freezing point under pressure substantially above 0° C., i.e., it may be as high as 14° C. or more. Most commonly, it will be about 4° C.–8° C. A characteristic feature of the gasified ice product is its ability to release gas at a controlalble rate when melted as, e.g., by adding to an aqueous liquid.

The novel gasified ice of this invention, an ice containing bound gas, may comprise a solid matrix of ice containing a conditionally stable hydrate forming gas at a partial pressure at least as great as the conditionally stable hydrate forming pressure and less than the vapor-liquid equilibrium pressure at the temperature of formation and in amount at least equal to the minimum hydrate quantity of gas.

The density of the product in the case of carbon dioxide may be of the order of 0.94 gm. per cc.–0.99 gm. per cc. or higher which is slightly heavier than ordinary ice which has a density of about 0.92 gm. per cc.

The stability of the novel product of this invention is good below 0° C. Its initial stability is favorable in that any gas which is not securely locked within the ice matrix is readily liberated during the degassing or stabilizing period without danger of explosion or product deterioration. After this degassing, the stabilized product has a shelf life which is at least 30 days, and usually substantially longer, when the ice is maintained under controlled conditions of temperature. It is stable for an extended time under normal freezing conditions in a freezer, i.e., at −10° C.

In the case of a gasified ice containing nitrous oxide, the minimum hydrate ratio is of the order of about 15 ml. of gas per gram of product ice, which is obtained at about 150 p.s.i.g. Although it is readily possible, in the case of nitrous oxide, to attain ratios as high as 90–100 at pressures of 500–600 p.s.i.g., the ratio in the preferred product may be 50–75 conveniently attained at 200–400 p.s.i.g.

In the case of carbon dioxide, the novel gasified ice of this invention preferably contains at least about 25 milliliters of gas per gram of ice, which is roughly equivalent to 25 volumes of gas per volume of ice. Although it is readily possible to produce carbonated ice containing ratios of gas to solid as high as 100–115, the preferred product of this invention will contain a ratio of 50–90 and this will conveniently be prepared at 300–400 p.s.i.g. It is found that such a product, i.e., one containing a ratio of 50–90 is characterized by its high stability.

According to a specific example of this invention, 300 ml. of water at 25° C. was placed within a Parr pressure reactor of two-liter capacity. The vessel was closed, agitation started, and nitrous oxide was admitted thereto at 400 p.s.i.g. The vessel was placed within a constant temperature bath which maintained the contents at just slightly above 0° C. The nitrous oxide feed was adjusted to keep the pressure at 400 p.s.i.g. during the course of the reaction. After 120 minutes, the vessel was removed from the bath, cooled, depressurized, and opened. The contents were removed and the ice was stored for 24 hours at minus 10° C. to effect removal of non-bound gas. Testing of the degasified product revealed that it had a nitrous oxide content of 93 volumes of nitrous oxide per gram of ice.

The degasified nitrous oxide-containing ice in superficial appearance resembled ordinary ice. It had a density of about 0.97 gm. per cc. On dropping a compact piece having a volume of about 30 cc. (roughly the equivalent of a "standard" ice cube) into 250 ml. of water, a vigorous evolution of gas was observed.

A second sample of the gasified ice was subjected to storage tests in a refrigerator at −10° C. It was tested and no loss of gas was apparent during 33 days' storage.

According to another specific example of this invention, the vessel containing the same amount of water as before was closed, agitation started, and nitrous oxide was admitted thereto at 300 p.s.i.g. The vessel was placed within a constant temperature bath which maintained the contents at just slightly above 0° C. The nitrous oxide feed was adjusted to keep the pressure at 300 p.s.i.g. during the course of the reaction. After 60 minutes, the vessel was removed from the bath, cooled, depressurized, and opened. The contents were removed and the solid ice was stored for 24 hours at minus 10° C. to effect removal of non-bound gas. Testing of the degasified product revealed that it had a nitrous oxide content of 57 volumes of nitrous oxide per volume of product ice.

The degasified nitrous oxide-containing ice in superficial appearance resembled ordinary ice. It had a density of about 0.97 gm. per cc. On dropping a compact piece having a volume of about 30 cc. (roughly the equivalent of a "standard" ice cube) into 250 ml. of water, a vigorous evolution of gas was observed.

A second sample of the gasified ice was subjected to storage tests in a refrigerator at −10° C. It was tested and no loss of gas was apparent during 33 days.

According to still another specific example of this invention, 300 ml. of water at 25° C. was placed within a Paar pressure reactor of two-liter capacity. The vessel was closed, agitation started, and carbon dioxide was admitted thereto at 400 p.s.i.g. The vessel was placed within a constant temperature bath which maintained the contents at just slightly over 0° C. The carbon dioxide feed was adjusted to keep the pressure at 400 p.s.i.g. during the course of the reaction. After 75 minutes, the vessel was removed from the bath, cooled, depressurized, and opened. The contents were removed and the solid ice was stored for 24 hours at minus 10° C. to effect degasification. Testing of the degasified product revealed that it had a carbon dioxide content of 70 volumes of carbon dioxide per gram of ice.

The degasified carbonated ice in superficial appearance resembled ordinary ice. It had a density of about 0.97 gm. per cc. On dropping a compact piece having a volume of about 30 cc. (roughly the equivalent of a "standard" ice cube) into 250 ml. of water, a vigorous evolution of gas was observed.

A second sample of the carbonated ice was subjected to storage tests in a refrigerator at −10° C. It was tested and no loss of carbon dioxide gas was ipparent after 33 days.

The gasified ice product of this invention may find a wide variety of uses. Typically it may be used as a novel means for storing, transporting, or liberating a gas. For example, if it be desired to liberate carbon dioxide for use in a particular reaction or process (on either a laboratory or industrial scale) the gasified ice may be either melted by application of heat or preferably by addition to water. Chlorine may be similarly liberated to obtain a bleaching gas. It will be readily apparent that this technique is particularly advantageous in that it operates at atmospheric pressure, i.e., the ice need not be maintained under pressure.

When the gas contained within the ice is a non-toxic comestible gas, typically carbon dioxide, the ice may be employed as a means of producing a carbonated beverage. In this respect it differs substantially from ices prepared by carbonating under conditions outside the scope of this invention.

In order to set forth the unusual features of the instant invention more clearly by contrasting it with unsatisfactory prior art techniques, a sample of ice was prepared containing 5 volumes of gas by pressuring water with 70 p.s.i.g. of carbon dioxide and then subjecting the carbonated mixture to freezing. The product formed under these conditions had a freezing point which was lower than that of water.

A compact piece about 30 cc. volume was dropped into 250 ml. of water. It was noted that the evolution of gas was barely noticeable and the carbonation of the liquid was extremely low. The bubbles which were liberated were much too small in size and the quantity thereof was inadequate to effect carbonation. The final mixture, upon tasting, did not give a true soda taste and it was found to be flat after a few minutes.

In all respects the product prepared by carbonation at 70 p.s.i.g. was eminently inferior to the novel product of applicants' invention.

It will be apparent to those skilled in the art that although the instant invention has been described in connection with several specific examples, there will be numerous modifications which may be made which fall within the scope of this invention. This application is a continuation-in-part of application Serial No. 726,657, filed April 7, 1958, and now Patent No. 2,975,603 by the same inventors, entitled Process and Product.

We claim:

1. The process of producing a gasified ice characterized by a high gas content and a high degree of stability which comprises contacting aqueous liquid with nitrous oxide gas under conditionally stable hydrate pressure of 150–600 p.s.i.g., maintaining said aqueous liquid and said nitrous oxide in contact for time sufficient to permit absorption in said liquid of nitrous oxide in the form of a conditionally stable hydrate, maintaining the temperature of said liquid and said gas during said absorption within the gasified-ice-freezing temperature range of above 0° C. to about 14° C., and withdrawing gasified ice containing at least 15 ml. of nitrous oxide per gram of ice.

2. The process of claim 1 wherein the product gasified ice contains nitrous oxide in amount of 40–55 ml. per gram of ice.

3. A gasified ice product comprising ice containing bound nitrous oxide in amount equal at least to the minimum hydrate ratio of about 15 and prepared at a pressure of at least about 150 p.s.i.g. and less than about 600 p.s.i.g.

References Cited in the file of this patent

UNITED STATES PATENTS

| | | |
|---|---|---|
| 2,240,769 | Glazer | May 6, 1941 |
| 2,575,509 | Bayston | Nov. 20, 1951 |
| 2,590,542 | Jones | Mar. 25, 1952 |
| 2,904,511 | Donath | Sept. 15, 1959 |
| 2,975,603 | Barnes et al. | Mar. 21, 1961 |